(No Model.)

B. DAVIS & G. W. BOWERS.
NUT LOCK.

No. 532,771. Patented Jan. 22, 1895.

Witnesses:
Walter Famariss
Rose O. Rabbitt

Inventors:
Geo. W. Bowers,
Benjamin Davis.

By John S. Duffie Attorney

UNITED STATES PATENT OFFICE.

BENJAMIN DAVIS AND GEORGE W. BOWERS, OF FORDYCE, ARKANSAS.

NUT-LOCK.

SPECIFICATION forming part of Letters Patent No 532,771, dated January 22, 1895.

Application filed June 6, 1894. Serial No. 513,676. (No model.)

*To all whom it may concern:*

Be it known that we, BENJAMIN DAVIS and GEORGE W. BOWERS, citizens of the United States, residing at Fordyce, in the county of Dallas and State of Arkansas, have invented certain new and useful Improvements in Nut-Locks; and we do hereby declare the following to be a full, clear, and exact description of the invention, such as will enable others skilled in the art to which it appertains, to make and use the same.

Our invention has relation to nut locks; and consists in the novel construction and arrangements of its parts. It may be applied to any nut, no matter where or how situated, but is designed and more particularly adapted to nut locks used to secure fish plates to rail roads.

Figure 1:
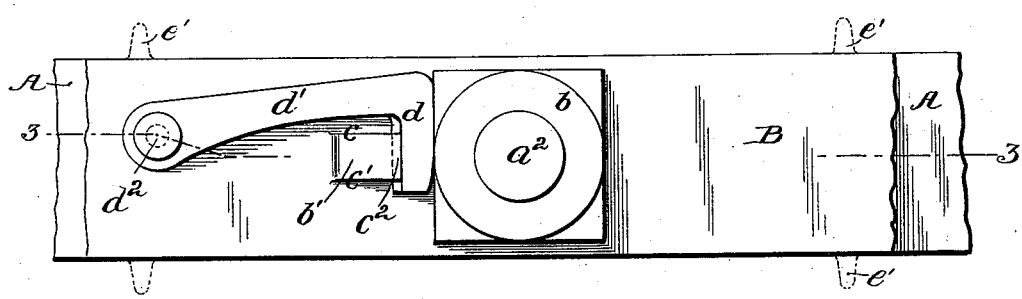
Figure 2:
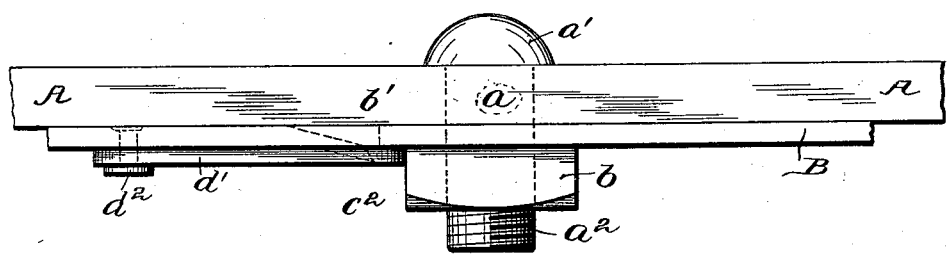
Figure 3:
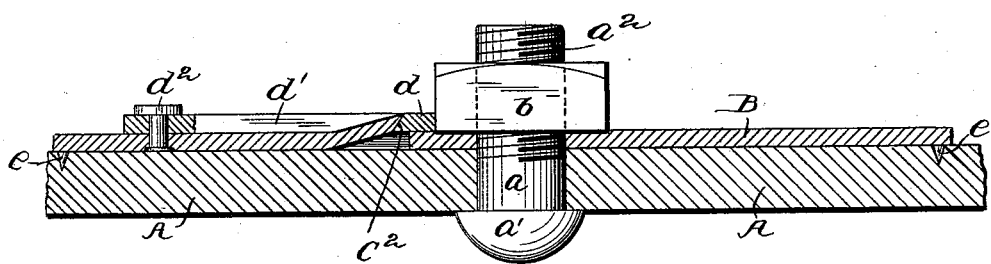

In the accompanying drawings: Figure 1 is an elevation of our invention. Fig. 2 is an edge view looking down. Fig. 3 is an edge view looking up, and is sectional cut on the line 3, of Fig. 1.

Our invention is described as follows:

A, represents a railway rail or any material.

B, represents a plate that fits up against the side or edge of the material A. This plate may or may not be a fish plate, and it may be long enough and adapted to cover two or more nuts.

$a$, is a bolt provided with a head $a'$, and a threaded part $a^2$.

$b$, is an ordinary threaded nut being square or octagon as desired.

The plate B, is provided with a spring tongue $b'$. This spring tongue is integral with and is made by cutting through said plates three slots—$c$, $c'$, and $c^2$, and then the said tongue is turned out a little and its under side beveled. The end of said tongue is far enough away from the nut $b$, to allow a wedge $d$, to be thrust down by the side of the said nut, and between the said nut and the end of said tongue. The edge of said wedge that comes in contact with the end of the tongue is beveled, so that its beveled part will pass under the beveled part of said tongue and hold it (said wedge) from lateral movement. Said wedge is integral with and a part of an arm $d'$, and is turned down so that it may answer the purpose of a wedge. Said arm $d'$, is perforated at its pivot end and is bolted or otherwise pivoted to the outer face of the plate B, at the point indicated by $d^2$.

The lower end and front edge of the wedge $d$, is rounded off a little, so that said wedge may be easily tapped up and out of place, and when so removed, it may be thrown back and the nut $b$, turned up or down. When the nut is turned home, the wedge is driven in place and the nut is secured. Its gravity and its contact with the spring tongue $b'$, hold it in place. The fact that said latch or arm $d'$, and the wedge $d$, is pivoted to the plate B, prevents it from being lost or misplaced.

When the lock is to be used on railway ties, the plate B, is long enough to accommodate two bolts, and provided with two latches, but when the lock is to be applied to material that has a surface convex or concave, the plate is curved, to fit such convexity or concavity, in which case there need be but one perforation in said plate, and one latch secured to the same.

When the surface of the material to be bolted is flat, the plate B, may be provided with projections or teeth $e$, by raising the same on the under side of the plate, or by turning a part of the end of the plate down. Said teeth or projections should be driven into the face of the wood, but when the material to be bolted is metal, and the surface is flat, said plate may be provided with side projections $e'$, (Fig. 1) which projections may be turned down against the edges of the material to be bolted.

Having described our invention, what we claim as new, and desire to secure by Letters Patent, is—

1. In combination with material to be bolted together, the perforated plate B, provided with projections $e$, $e'$, and having cut in one end slots $c$, $c'$, and $c^2$, and having integral with said plate a tongue $b'$, beveled on the lower side of its free end, and latch consisting of the arm $d'$, pivoted to the outer face of said plate; threaded bolt $a$, passing through the material to be bolted together and said plate; nut $b$, screwing on the threaded end of said bolt and against the outer face of said plate; wedge $d$, integral with said arm, having one edge beveled to pass under and impinge against the beveled end of the tongue $b'$, and its other edge adapted to impinge against one edge of the nut $b$, to prevent it from turning, substantially as shown and described and for the purposes set forth.

2. In combination with material to be bolted together, the perforated plate B, having cut in one end slots $c$, $c'$, and $c^2$, and having integral with said plate a tongue $b'$, beveled on the lower side of its free end, and a latch consisting of the arm $d'$, pivoted to the outer face of said plate; threaded bolt $a$, passing through the material to be bolted together and said plate; nut $b$, screwing the threaded end of said bolt and against the outer face of said plate; wedge $d$, integral with said arm, having one edge beveled to pass under and impinge against the beveled end of the tongue $b'$, and its other edge adapted to impinge against one edge of the nut $b$, to prevent it from turning, substantially as shown and described and for the purposes set forth.

In testimony whereof we affix our signatures in presence of two witnesses.

BENJAMIN DAVIS.
GEORGE W. BOWERS.

Witnesses:
JAMES M. RAINES,
ROBERT H. DEDMAN, Jr.